Jan. 13, 1970     A. W. BLACKMAN ET AL     3,488,950
TRIPROPELLANT ROCKET
Filed Dec. 18, 1961
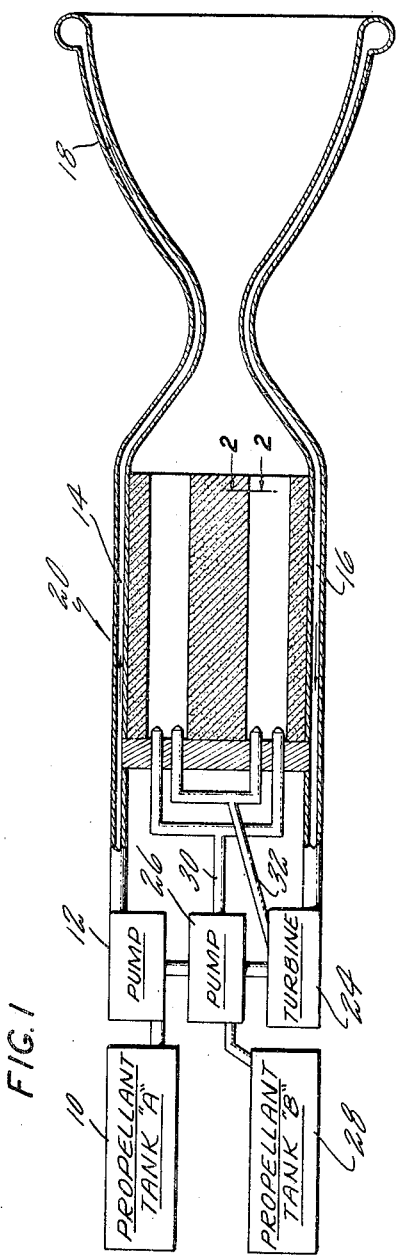
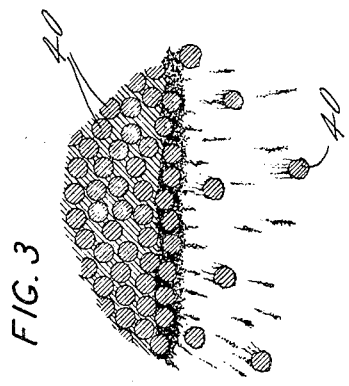
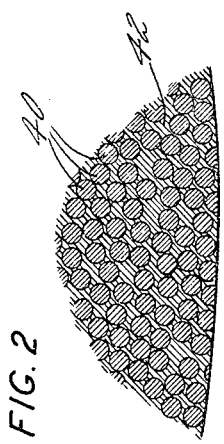
INVENTORS
ARTHUR W. BLACKMAN
JOSEPH R. KEILBACH
BY Leonard F. Webbird
ATTORNEY United States Patent Office 3,488,950
Patented Jan. 13, 1970

3,488,950
TRIPROPELLANT ROCKET
Arthur W. Blackman, Manchester, and Joseph R. Keilbach, Glastonbury, Conn., assignors to United Aircraft Corporation, East Hartford, Conn., a corporation of Delaware
Filed Dec. 18, 1961, Ser. No. 160,972
Int. Cl. F02c 3/20
U.S. Cl. 60—39.46
2 Claims This invention relates to tripropellant rocket motors and more particularly to arrangements having two fluid fuels and one solid propellant. It is well known that the hydrogen-oxygen-beryllium and/or the hydrogen-fluorine-beryllium rocket propellant systems have highly attractive theoretical specific impulses and payload delivery capability.

Because burning rates of metals vary inversely as the particle diameter, it is necessary to burn the beryllium in the form of very small particles in order to obtain sufficiently high combustion efficiencies in a rocket motor combustion chamber. With this requirement are a number of concomitant problems: viz, (1) it is very difficult to introduce a finely divided powder into a gaseous stream without problems with metering, regulation, and clogged lines, valves, etc.; (2) a similar family of problems is encountered if the particles are introduced into the combustion chamber via a liquid slurry; and (3) small beryllium particles are highly toxic due to attack on the respiratory system, although particles too large to enter the lungs during breathing are relatively safe. A rocket motor combustion chamber is disclosed herein which will eliminate the problems discussed above.

It is, therefore, an object of this invention to provide a tripropellant rocket which includes the use of two liquid fuels and beryllium fuel in the form of smaller particles incased in a suitable binder.

This and other objects of this invention will become readily apparent from the following detailed description of the drawings, in which:

FIG. 1 is a schematic illustration of a rocket motor according to the invention.

FIG. 2 is a partial section taken along the line 2—2 of FIG. 1.

FIG. 3 is similar to FIG. 2 illustrating the release of the beryllium particles upon heating of the binder. The combustion chamber and associated equipment is illustrated in FIG. 1. Liquid hydrogen is stored in tank 10. Pump 12 forces the hydrogen in a liquid phase through regenerative cooling passages 14 and 16 to cool the exhaust nozzle 18 and, if necessary, parts of the combustion chamber 20. The hydrogen vaporizes and passes into a turbine 24 which supplies power for the hydrogen pump 12 and an oxygen (or fluorine) pump 26. Liquid oxygen (or fluorine) is stored in tank 28. The oxygen (or fluorine) passes through line 30 and is injected through suitable injectors into combustion chamber 20. The hydrogen is injected into the combustion chamber through line 32.

A solid grain is made by mixing small particles 40 (FIGS. 2 and 3) of beryllium (approximately $10\mu$ diameter) with a hydrocarbon binder 42 such as a copolymer of acrylic acid and butadiene. Approximately 5–15 percent binder is required for strength. Because the beryllium particles are completely sealed by the binder there are no toxicity or handling problems during storage. The beryllium grain is designed (employing well-known techniques) to have neutral burning characteristics (i.e., a grain configuration which, at a given chamber pressure, leads to a constant mass flow rate from its burning surface during chamber operation). The binder pyrolizes at temperatures of the order of 600° F. and releases the beryllium particles into the combustion chamber as seen in FIG. 3 (beryllium melts at 2340° F.). The hydrogen-oxygen injectors are spaced so an oxygen rich atmosphere is provided near the grain surface. Because the rate of heat transfer to the grain surface varies approximately with the first power of combustion chamber pressure and the flow of beryllium into the chamber is proportional to the rate of heat transfer to the grain, it may be possible to throttle the combustion chamber (vary the combustion chamber pressure) without grossly affecting the over-all chamber mixture ratio.

As a result of this invention a rocket motor is provided having a combustion chamber containing a solid grain composed of small beryllium particles embedded in a hydrocarbon binder and employing hydrogen-oxygen injectors spaced to provide an oxidizer-rich atmosphere at the grain surface.

The advantages of the arrangement of this novel motor system may be set forth as follows:

(1) This system provides a simple, reliable way of burning beryllium, hydrogen, oxygen (or fluorine) mixtures to achieve ultra-high specific impulses.

(2) Toxicity problems usually associated with the handling and storage of beryllium powders are eliminated because the beryllium powder would be sealed in a binder matrix.

(3) Combustion chamber wall cooling problems are reduced (because of the internal burning solid beryllium grains), and the exhaust nozzle can be regeneratively cooled.

(4) It is possible to throttle this system with reasonably small changes in over-all mixture ratio by varying chamber pressure at a fixed hydrogen-to-oxidizer ratio.

(5) Thrust termination can be accurately controlled by terminating the hydrogen and oxidizer flows.

(6) Relight capability is simply achieved.

(7) Combustion efficiency is relatively high if small beryllium particles (approximately $10\mu$, or micron, diameters) are utilized.

We claim:

1. A tripropellant rocket engine including at least two fluid propellant sources, a combustion chamber, means for conducting fuels from said sources to the said combustion chamber, a solid propellant for said rocket located in said chamber, said solid propellant including a number of beryllium particles in the order of $10\mu$ diameter, a hydrocarbon binder for said particles, said binder having a decomposition temperature lower than that of said particles, and means for igniting the fluid propellants in order to decompose said binder and release the solid particles for burning with said fuels.

2. A rocket engine according to claim 1 wherein said binder pyrolizes at temperature of approximately 600° F.

References Cited

UNITED STATES PATENTS

| 2,753,801 | 7/1956 | Cumming | 102—49 |
| 2,984,973 | 5/1961 | Stegelman | 60—35.6 |
| 2,799,987 | 7/1957 | Chandler | 60—35.6 |
| 2,998,703 | 9/1961 | Badders | 60—35.6 |

SAMUEL FEINBERG, Primary Examiner

U.S. Cl. X.R.
60—251